(12) United States Patent
Ohashi et al.

(10) Patent No.: US 8,901,465 B2
(45) Date of Patent: Dec. 2, 2014

(54) BONDING METHOD AND APPARATUS THEREFOR

(75) Inventors: Osamu Ohashi, Niigata (JP); Keiichi Minegishi, Saitama (JP); Yasunori Yoshida, Toride (JP); Kouji Wada, Kashiwa (JP)

(73) Assignee: SMC Kabushiki Kaisha, Tokyo (JP)

( * ) Notice: Subject to any disclaimer, the term of this patent is extended or adjusted under 35 U.S.C. 154(b) by 996 days.

(21) Appl. No.: 12/277,863

(22) Filed: Nov. 25, 2008

(65) Prior Publication Data

US 2009/0139646 A1 Jun. 4, 2009

(30) Foreign Application Priority Data

Nov. 29, 2007 (JP) ................. 2007-308147

(51) Int. Cl.
*B23K 13/01* (2006.01)
*C04B 37/00* (2006.01)
*B23K 20/02* (2006.01)

(52) U.S. Cl.
CPC ..................................... *B23K 20/02* (2013.01)
USPC .......................................... 219/603; 156/325

(58) Field of Classification Search
USPC ......... 156/273.7, 380.9; 219/148, 603, 78.02, 219/608, 149; 228/193, 218
See application file for complete search history.

(56) References Cited

U.S. PATENT DOCUMENTS

| | | | | |
|---|---|---|---|---|
| 5,436,202 A * | 7/1995 | Miura | ........................... | 228/102 |
| 5,760,378 A * | 6/1998 | Christian et al. | ............. | 219/603 |
| 6,269,998 B1 * | 8/2001 | Katayama et al. | ............ | 228/102 |
| 7,119,309 B2 * | 10/2006 | Matsuoka et al. | ............ | 219/603 |
| 2001/0009176 A1 * | 7/2001 | Mori et al. | .................... | 156/325 |
| 2002/0011468 A1 * | 1/2002 | Miyasaka et al. | .......... | 219/78.02 |
| 2003/0136765 A1 | 7/2003 | Miklos et al. | | |
| 2006/0043870 A1 * | 3/2006 | Tsuda et al. | ................... | 313/495 |
| 2006/0118598 A1 * | 6/2006 | Chikamori et al. | ............. | 228/42 |

FOREIGN PATENT DOCUMENTS

| | | |
|---|---|---|
| CN | 101090082 A | 12/2007 |
| DE | 29 40 959 C2 | 4/1981 |

(Continued)

OTHER PUBLICATIONS

Chinese Office Action issued Mar. 23, 2011, in Patent Application No. 200810179513.8 (with English-language translation).

(Continued)

*Primary Examiner* — Dana Ross
*Assistant Examiner* — Hung D Nguyen
(74) *Attorney, Agent, or Firm* — Oblon, Spivak, McClelland, Maier & Neustadt, L.L.P.

(57) ABSTRACT

A nitrogen gas tank, a rotary pump and a mechanical booster pump are connected to a bonding vessel that constitutes a bonding apparatus for carrying out diffusion bonding, the apparatus further comprising a pressure sensor. A nitrogen gas atmosphere is formed inside the bonding vessel, and under control operations of a control circuit, a nitrogen introduction rate is controlled so that a pressure is substantially fixed at a predetermined pressure between $3\text{-}10^5$ Pa. At such a state, under the action of a rod of a hydraulic cylinder, a second electrode is brought into proximity with a first electrode, so that ultimately, a first object to be bonded and a second object to be bonded on the first electrode are pressed. Further, current is applied through the first electrode and the second electrode with respect to the first object to be bonded and the second object to be bonded.

7 Claims, 5 Drawing Sheets

(56) References Cited

FOREIGN PATENT DOCUMENTS

| | | |
|---|---|---|
| DE | 44 30 779 C2 | 3/1996 |
| DE | 101 62 937 A1 | 7/2003 |
| JP | 62-203687 | 9/1987 |
| JP | 6-179083 | 6/1994 |
| JP | 08-257767 | 10/1996 |
| JP | 10-294127 | 11/1998 |
| JP | 2003-200272 | 7/2003 |
| JP | 2006-315040 | 11/2006 |
| JP | 2006315040 A * | 11/2006 |
| WO | WO 2006/038030 A2 | 4/2006 |

OTHER PUBLICATIONS

Xue-fang Wang, et al., "Development of a Multifunctional Equipment for Vacuum Wafer Bonding", Machinery & Electronics, vol. 6, Dec. 31, 2005, pp. 32-34 (with English Abstract).

Office Action issued Apr. 3, 2012 in Japan Application No. 2007-308147 (With Partial English Translation).

Office Action issued Sep. 2, 2013 in German Patent Application No. 10 2008 058 773.7.

Japanese Office Action mailed Oct. 9, 2012 in Japanese Patent Application No. 2007-308147 filed Nov. 29, 2007 (with partial English translation).

\* cited by examiner

FIG. 3

| ATMOSPHERIC GAS AND PRESSURE | $N_2$ PARTIAL PRESSURE | $O_2$ PARTIAL PRESSURE |
|---|---|---|
| VACUUM ($3 \times 10^{-3}$Pa) | $1.7 \times 10^{-4}$ | $5.3 \times 10^{-5}$ |
| VACUUM (3Pa) | 0.167 | $7.0 \times 10^{-2}$ |
| $N_2$ (3Pa) | 2.99 | $7.2 \times 10^{-4}$ |
| Ar (3Pa) | 0.0111 | $1.8 \times 10^{-3}$ |
| $N_2$ ($10^2$Pa) | 99.5 | $4.6 \times 10^{-2}$ |
| $N_2$ ($10^5$Pa) | 99800 | 7.6 |
| Ar ($10^5$Pa) | 426 | 65.6 |
| AIR ($10^5$Pa) | 79600 | 17500 |

FIG. 5

| ATMOSPHERIC GAS PRESSURE [Pa] | | TENSILE STRENGTH [MPa] |
|---|---|---|
| NITROGEN GAS | 5 | 600 |
| | $10^2$ | 580 |
| | $10^5$ | 550 |
| AIR | $10^{-2}$ | 620 |
| | 5 | 560 |
| | $10^2$ | 380 |
| | $10^5$ | 110 |

BONDING METHOD AND APPARATUS THEREFOR

BACKGROUND OF THE INVENTION

1. Field of the Invention

The present invention relates to a bonding method and an apparatus therefor by which respective objects to be bonded are joined together by performing pressurization and heating with respect to a plurality of bonding objects that are in mutual contact.

2. Description of the Related Art

As one method for joining together objects to be bonded, diffusion bonding is known. More specifically, in such a method, by carrying out electrical energization or high frequency heating or the like, while pressure is imparted to bonding objects that are in mutual contact with each other, the objects are heated whereupon atoms existing at the contact region are dispersed, and as a result, both of the bonding objects are joined (bonded) together. In the case where electrical energization is performed, as the objects to be bonded (conductive bodies), all types of metallic materials, starting with steel materials, nickel alloys and copper alloys, have been selected.

In the case that diffusion bonding is carried out on the above-mentioned metallic bonding objects, when oxygen is included excessively within the bonding environment, an oxide film is formed on the surface of the metallic bonding objects, the temperature of which has been raised along with supplying electricity thereto. In this case, the diffusion of atoms is obstructed by the oxide film, and owing thereto, a concern exists in that the bonding strength (joint strength) of the bonded region cannot be assured.

In order to avert such a concern, the electrical energization and pressurizing of such metallic bonding materials generally is performed inside of a high vacuum bonding vessel, or in a bonding vessel containing an inert gas atmosphere. In the case that a high vacuum is formed in the bonding vessel, a rotary pump and a diffusing pump are both combined for carrying out evacuation of the bonding vessel, whereby setting of the pressure inside the bonding vessel on the order of $10^{-3}$ Pa is extensively carried out. In the case that further lowering of the pressure is necessary, apart from the aforementioned two pump types, a turbomolecular pump may also be combined therewith.

Further, in the case that an inert gas atmosphere is provided inside the bonding vessel, argon gas, helium gas or the like have been adopted principally as the inert gas, although depending on the circumstances, nitrogen gas has also been employed. (See, for example, Japanese Laid-Open Patent Publication No. 2006-315040.)

In the event that a diffusing pump or a turbomolecular pump is provided for establishing a high vacuum in the bonding vessel, because the cost for such pumps is high, the investment in equipment costs escalates. Further, in the case of using an inert gas atmosphere, completely exhausting the initial atmosphere (oxygen) contained initially within the bonding vessel is not easily accomplished, and thus, a defect in which generation of an oxide film cannot easily be avoided is manifested. In addition, because argon gas, helium gas and the like are comparatively high in cost, processing costs for carrying out diffusion bonding have tended to be high as well.

Furthermore, recently, attention has focused on nitrogen doped stainless steel containing a specified quantity of nitrogen to improve corrosion resistance. However, when melt welding is carried out with respect to this material, it has been reported that the nitrogen content amount at the bonding region is lowered. Of course, as a cause thereof, there is a concern that corrosion resistance also would be lowered.

SUMMARY OF THE INVENTION

A general object of the present invention is to provide a bonding method whereby the generation of an oxide film on objects to be bonded can easily be avoided.

A principal object of the present invention is to provide a bonding method which is capable of assuring bonding strength (joint strength) even in the case that nitrogen doped stainless steel materials are bonded together.

A further object of the present invention is to provide a bonding method that can be implemented at a low cost.

Another object of the present invention is to provide a bonding apparatus, which is capable of implementing the aforementioned bonding method.

According to a first embodiment of the present invention, a bonding method is provided in which, while heating is carried out with respect to a first bonding object and a second bonding object that are in mutual contact, pressure is imparted to the first bonding object and the second bonding object, whereby both bonding objects are joined together, the bonding method including the steps of:

accommodating the first bonding object and the second bonding object in a bonding vessel and introducing a nitrogen gas into the bonding vessel, while controlling a pressure inside of the bonding vessel to be between $3\text{-}10^5$ Pa; and heating the first bonding object and the second bonding object while applying pressure with respect to the first bonding object and the second bonding object.

In the case where a nitrogen gas atmosphere is provided inside the bonding apparatus within the aforementioned pressure range, the oxygen partial pressure is lowered significantly. Owing thereto, it becomes easy to prevent the generation of an oxide film on the surfaces of the objects to be bonded, and consequently, diffusion bonding can be promoted with good efficiency. As a result, the joint strength of the bonding region is assured.

In addition, in this case, since there is no need to provide a high vacuum in the bonding vessel, there is no particular necessity to provide an evacuation mechanism, such as a high cost diffusing pump or a turbomolecular pump, in order to obtain a high vacuum. Accordingly, equipment investments can be reduced, and moreover, because low cost nitrogen gas is utilized, the costs required for diffusion bonding also are reduced.

As objects to be bonded, objects that are not subject to the formation of a nitride film upon heating, and further which are capable of inducing nitrogen to enter into a solid solution, are preferred. In this case, since the first bonding object and the second bonding object do not form a nitride film thereon, diffusion at the objects is not impeded. Further, even when voids exists between the first bonding object and the second bonding object and nitrogen gas, which forms the atmospheric gas, resides within such voids, the nitrogen gas forms a solid solution on the first bonding object or the second bonding object. Accordingly, the voids easily are made to vanish, and the joint strength at the bonding region is enhanced.

As a preferred example of a type of material, a steel material may be given. Herein, steel materials such as carbon steel, alloyed steel, stainless steel and the like contain nitrogen therein, as a result of being molten and refined in the atmosphere. Further, nitrogen doped stainless steels, which have been positively doped with nitrogen, also contain nitrogen therein, and owing thereto, do not lead to the formation of a nitride film upon heating and further are capable of inducing nitrogen to enter into a solid solution. Specifically, in the case of such materials, as a result of the bonding objects inducing nitrogen to enter into a solid solution, a function is performed to cause the voids to vanish. In particular, in the case of nitrogen doped stainless steel, by inducing nitrogen to enter into a solid solution, lowering of the nitrogen content is prevented, and owing thereto, corrosion resistance is assured.

Further, as examples of other metals, which do not cause the formation of a nitride film upon heating and which are capable of inducing nitrogen to enter into a solid solution, copper, nickel, and alloys thereof may also be given.

According to another embodiment of the present invention, a bonding apparatus is provided in which, while heating is carried out with respect to a first bonding object and a second bonding object that are in mutual contact, pressure is imparted to the first bonding object and the second bonding object, whereby both bonding objects are joined together, comprising:

a heating mechanism for heating the first bonding object and the second bonding object;

a bonding vessel for accommodating the first bonding object and the second bonding object therein;

a nitrogen gas supply source for supplying a nitrogen gas to the bonding vessel;

an exhaust mechanism for carrying out exhausting from the bonding vessel; and a pressure control mechanism for controlling a pressure of the nitrogen gas supplied from the nitrogen gas supply source and introduced into the bonding vessel, wherein the pressure control mechanism controls a pressure of the nitrogen gas to be between $3\text{-}10^5$ Pa.

As a result of such a structure, the generation of an oxide film and a nitride film on objects to be bonded can easily be avoided with an inexpensive investment in equipment. Therefore, diffusion bonding can be promoted and carried out effectively at a low cost.

As the exhaust mechanism in the aforementioned structure, as noted above, a comparatively low cost rotary pump preferably is adopted. As a result, equipment investments can easily be reduced in cost and made inexpensive. Further, preferably, the rotary pump may be used in combination with a mechanical booster pump.

In the aforementioned structure, heating of the objects to be bonded is implemented by electrically energizing (i.e., by supplying electricity to) the bonding objects. Alternatively, the bonding objects also may be heated by performing high frequency induction heating.

In the foregoing manner, according to the present invention, because diffusion bonding is carried out under a nitrogen gas atmosphere inside of a predetermined pressure range, formation of an oxide film or a nitride film on surfaces of objects to be bonded is prevented. As a result, diffusion bonding can be promoted efficiently and the joint strength at the bonding region can be assured.

Further, since it is unnecessary to form a high vacuum inside the bonding vessel, there is no particular need for installing a high cost evacuation mechanism for obtaining a high vacuum. Accordingly, investments in equipment are inexpensive. Additionally, by using low cost nitrogen gas, the costs required for diffusion bonding can be reduced.

The above and other objects features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a chart showing the relationship between the type of atmospheric gas in the bonding apparatus and the pressure thereof, and partial pressures of nitrogen gas and oxygen gas;

FIG. 5 is a chart showing the relationship between the tensile strength of bonded objects bonded at 1000° C. and the atmospheric gas.

DESCRIPTION OF THE PREFERRED EMBODIMENTS

Below, an embodiment shall be presented and described in detail with reference to the accompanying drawings, of a relationship between a bonding method according to the present invention and an apparatus for carrying out such a method.

Figure 1:
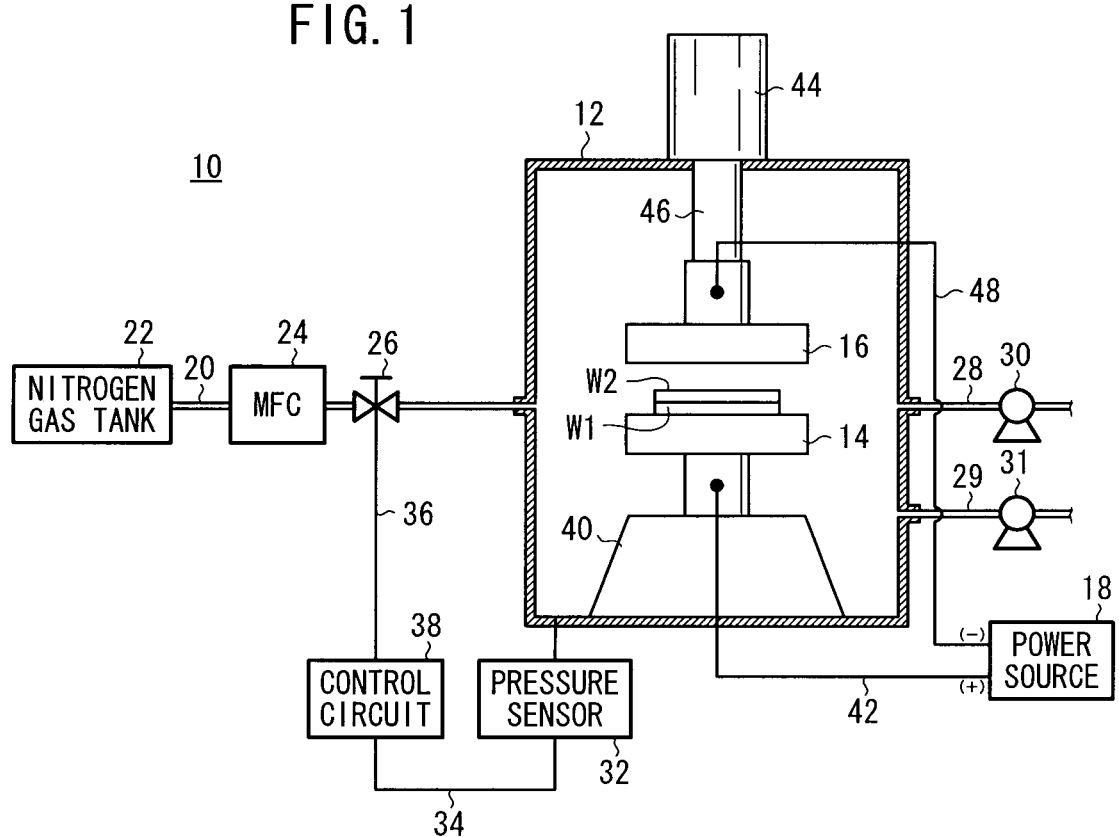
FIG. 1 is an outline schematic view of essential parts of the structure of a bonding apparatus according to an embodiment of the present invention.

FIG. 1 is an outline schematic view of essential parts showing a typical structure of a bonding apparatus 10 according to the present embodiment. The bonding apparatus 10 includes a bonding vessel 12 equipped with a non-illustrated opening and shutting door, and a first electrode 14 and a second electrode 16 accommodated inside the bonding vessel 12. The first electrode 14 and the second electrode 16, together with a power source 18 to be described later, constitute a heating source.

A nitrogen gas tank 22 (nitrogen gas supply source) for supplying nitrogen gas to the bonding vessel 12 through a gas supply line 20 is connected to the bonding vessel 12. Further, a mass flow controller (hereinafter referred to as MFC) 24 for controlling a flow rate of the nitrogen gas and a pressure adjusting valve 26 are interposed within the gas supply line 20, in this order, from the side of the nitrogen gas tank 22.

Further, a first exhaust line 28 and a second exhaust line 29 are connected to the bonding vessel 12 for exhausting gases from inside the bonding vessel 12. A rotary pump 30 is interposed within the first exhaust line 28, whereas a mechanical booster pump 31 is interposed within the second exhaust line 29. Accordingly, gases inside of the bonding vessel 12 are removed by the rotary pump 30 and the mechanical booster pump 31.

As is widely known, among various types of pumps, a rotary pump 30 is comparatively low in cost. At the same time, however, pressure cannot easily be lowered by means of such a rotary pump 30. In the present embodiment, when the pressure adjusting valve 26 is closed and the bonding vessel is evacuated, the pressure is on the order of $10^{-1}$ Pa.

A pressure sensor 32 is further connected to the bonding vessel 12 for measuring the pressure inside of the bonding vessel 12. The pressure sensor 32 and the pressure adjusting valve 26 are electrically connected to a control circuit 38 via respective signal lines 34 and 36.

The first electrode 14 is fixed and positioned in the bonding vessel 12 on a pedestal 40, so as to be directed upwardly therefrom as shown in FIG. 1. The first electrode 14 is connected electrically to a positive terminal of the power source 18 through a lead wire 42.

On the other hand, a second electrode 16, which is substantially the same structure as the first electrode 14, is disposed confronting the first electrode 14. Further, the second electrode 16 is fixed in position on an end of a rod 46 of a hydraulic cylinder 44. Specifically, the second electrode 16 approaches and separates away from the first electrode 14 along with advancing and retracting movements of the rod 46.

The second electrode 16 is connected electrically to a negative terminal of the power source 18 through a lead wire 48. Further, in FIG. 1, a state is shown in which an electrically open circuit is formed.

The bonding apparatus 10 according to the present embodiment basically is constructed as described above. Next, operations and effects of the apparatus shall be explained in relation to a bonding method performed thereby.

At first, the door of the bonding vessel 12 is opened, and a first bonding object W1 and a second bonding object W2 are inserted into the bonding vessel 12 from the opened door and mounted on the first electrode 14. At this time, the first bonding object W1 and the second bonding object W2 are both formed from nitrogen doped stainless steel, end surfaces of which are stacked mutually upon one another.

Next, the door is closed and after the bonding vessel 12 is placed in a hermetically sealed state, the rotary pump 30 and the mechanical booster pump 31 are energized, whereupon the bonding vessel 12 is evacuated through the first exhaust line 28 and the second exhaust line 29. Of course, at this time, the pressure adjusting valve 26 is closed. As described above, the pressure inside the bonding vessel 12 is lowered and ultimately becomes on the order of $10^{-1}$ Pa.

Information relating to the pressure inside the bonding vessel 12 is transmitted to the control circuit 38 through the pressure sensor 32 and the signal line 34. In addition, when the control circuit 38 confirms that the pressure inside the bonding vessel 12 has become substantially constant, the pressure adjusting valve 26 is opened by a command signal sent through the signal line 36. As a result, nitrogen gas begins to flow from the nitrogen gas tank 22 through the gas supply line 20. The nitrogen gas is introduced into the bonding vessel 12 via the MFC 24 and the pressure adjusting valve 26.

At this point, the control circuit 38 controls the nitrogen introduction rate so that the pressure inside the bonding vessel 12 reaches a substantially constant predetermined pressure between $3-10^5$ Pa. Specifically, based on information concerning the pressure inside the bonding vessel 12 obtained through the pressure sensor 32 and the signal line 34, the control circuit 38 generates a command signal to control the degree of opening of the pressure adjusting valve 26 through the signal line 36. In greater detail, when the pressure inside the bonding vessel 12 exceeds a predetermined upper limit value, by reducing the degree of opening of the pressure adjusting valve 26 the introduction rate of the nitrogen gas is made to decrease, while on the other hand, when the pressure inside the bonding vessel is less than a lower limit value, the degree of opening of the pressure adjusting valve 26 is made larger and the introduction rate of the nitrogen gas is made to increase.

Inside of the bonding vessel 12, for example, in the event that the nitrogen gas atmosphere is kept at a pressure of 3 Pa, compared to an air atmosphere or an argon gas atmosphere at the same pressure, the oxygen partial pressure becomes remarkably lower. Specifically, the oxygen partial pressure in this case is equivalent to the oxygen partial pressure for a case in which the pressure is set at $3 \times 10^{-3}$ Pa when the atmosphere is evacuated. Similarly, also for a case in which the nitrogen gas atmosphere is formed while setting the pressure inside the bonding vessel 12 at $10^5$ Pa, compared to an air atmosphere or an argon gas atmosphere at the same pressure, the oxygen partial pressure is remarkably small.

In this manner, by using a nitrogen gas as the atmospheric gas, even if the pressure of the bonding environment is comparatively high, the oxygen partial pressure inside the bonding vessel 12 can be made on an order equivalent to the oxygen partial pressure for a case in which the interior of the bonding vessel 12 is evacuated to a vacuum state.

Figure 2:
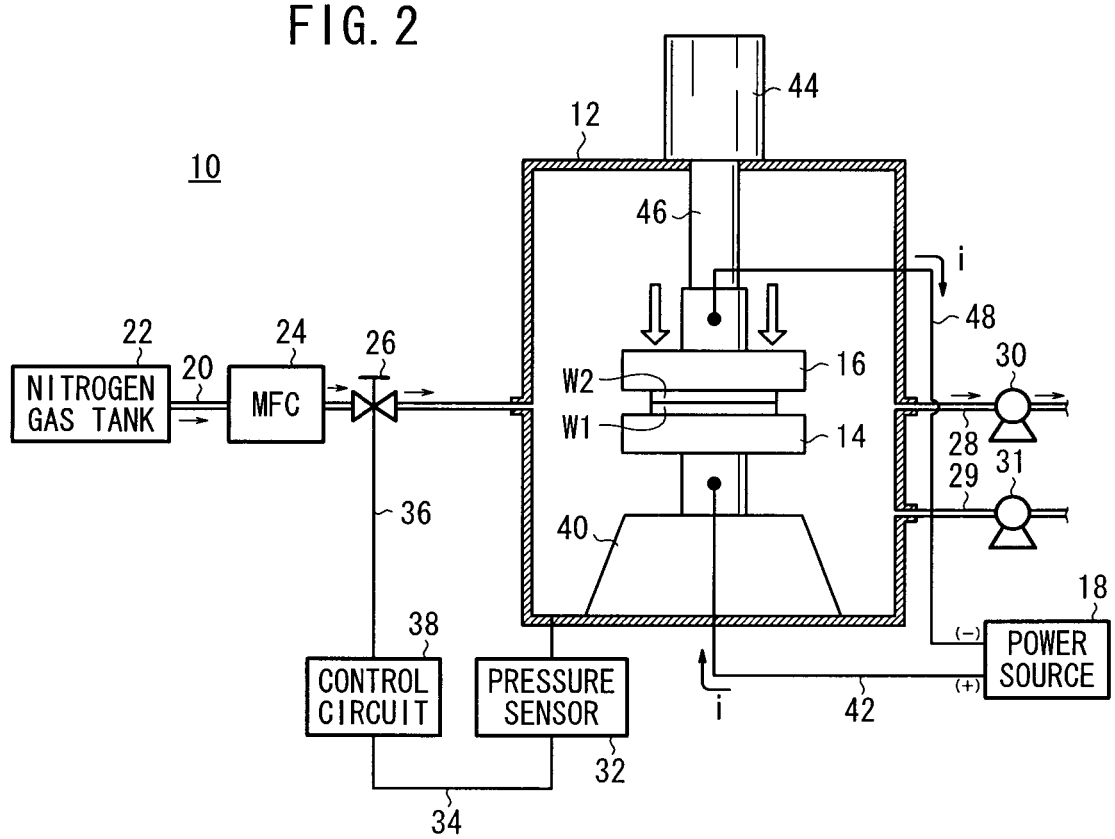
FIG. 2 is an outline schematic view of essential parts showing a typical state in which the bonding apparatus of FIG. 1 is used for heating bonding objects while the objects are pressed.

Next, as shown in FIG. 2, the hydraulic cylinder 44 is energized and the rod 46 thereof is advanced downward. As a result, the second electrode 16 presses the second bonding object W2 and the first bonding object W1, and an electrically closed circuit is formed.

In this state, a current i is supplied from the power source 18. The current i is returned to the power source 18 through the first electrode 14, the first bonding object W1, the second bonding object W2, and the second electrode 16. Specifically, electrical energy is supplied with respect to both the first bonding object W1 and the second bonding object W2, accompanied by a rise in temperature of the first bonding object W1 and the second bonding object W2. Furthermore, atoms of the first bonding object W1 are diffused into the second bonding object W2, whereas atoms of the second bonding object W2 are diffused into the first bonding object W1.

As described above, in the present embodiment, electrical energy is supplied with respect to the first bonding object W1 and the second bonding object W2 in a nitrogen gas environment which is controlled at a predetermined pressure, or stated otherwise, under a condition in which the oxygen partial pressure is remarkably small. Accordingly, generation of an oxide film on surfaces of the first bonding object W1 and the second bonding object W2 can be prevented. Owing thereto, the diffusion of atoms is easily promoted, and as a result, solid phase bonding (diffusion bonding) can be implemented efficiently. Accordingly, the joint strength at the bonding region can be assured.

In addition, since nitrogen gas resides in the environment, even in the case that nitrogen is desorbed from the atom diffusion region in the first bonding object and the second bonding object (together with nitrogen doped stainless steel), nitrogen is replenished from the environment to the diffusion region. Specifically, since nitrogen is caused to enter into a solid solution within the diffusion region, lowering of the nitrogen content can be prevented.

Further, in the case that voids exist between the abutting end surfaces due to the existence of warping or the like in the first bonding object W1 and the second bonding object W2, when diffusion bonding is performed in an argon gas environment or in a helium gas environment, the first bonding object W1 and the second bonding object W2 are joined together under a condition in which argon gas or helium gas is trapped within such voids. More specifically, voids remain between the first bonding object W1 and the second bonding object W2, and owing thereto, there is a concern that the joint strength will be reduced.

In contrast thereto, in the present embodiment, diffusion bonding is carried out under a nitrogen gas environment. As described above, since the first bonding object W1 and the second bonding object W2 are obtained in a state where nitrogen is made to enter into a solid solution, nitrogen gas remaining within the voids is consumed by being solidly dissolved into the first bonding object W1 and the second bonding object W2. Owing thereto, it becomes possible to eliminate the voids from between the first bonding object W1 and the second bonding object W2, and accordingly, the joint strength between both of the bonded objects W1 and W2 is enhanced.

Moreover, the standard production energy for formation of a nitride film by stainless steel together with nitrogen is higher than the standard production energy for formation of an oxide film. That is, it is difficult for nitrogen gas in the environment to react with the first bonding object W1 and the second bonding object W2. Accordingly, nitrogen gas tends to be inert with respect to the first bonding object W1 and the second bonding object W2. Specifically, the formation of a nitride film on the first bonding object W1 and the second bonding object W2 is avoided.

After passage of a predetermined time, supply of current i from the power source 18 is halted and the rod 46 of the hydraulic cylinder 44 is retracted upwardly, thus returning to the state shown in FIG. 1. As a result, electrical energizing of the first bonding object W1 and the second bonding object W2 is halted, and along with terminating the diffusion of atoms, solid phase bonding (diffusion bonding) of the first bonding object W1 and the second bonding object W2 is completed. Specifically, the first bonding object W1 and the second bonding object W2 are joined together mutually over the entire surfaces thereof.

As described above, according to the present embodiment, a reduction in the nitrogen content at the diffusion region (bonding region) can be avoided, and diffusion of atoms can be effected sufficiently. Accordingly, corrosion resistance and joint strength at the bonding region can be assured.

Further, as understood from the above, according to the present embodiment, the use of high cost gases such as argon gas, helium gas or the like is unnecessary. Additionally, because there is no need for reducing the pressure inside the bonding vessel, it is sufficient simply to attach the rotary pump 30 and the mechanical booster pump 31 thereto. Stated otherwise, there is no particular need to provide a high cost diffusing pump or a turbomolecular pump. Accordingly, the equipment investments needed to construct the bonding apparatus 10 can be made inexpensive, and diffusion bonding can be implemented thereby at a low cost.

In the aforementioned embodiment, nitrogen doped stainless steel has been utilized as the first bonding object W1 and the second bonding object W2, however, various other types of steel materials beginning with stainless steel, nitrogen doped stainless steel, nickel alloys, copper alloys and the like, as well as other metals apart therefrom, also may be utilized. In this case as well, the formation of an oxide film and a nitride film is avoided. Further, because such materials can lead to nitrogen entering into a solid solution, residual voids within the bonding region can be avoided, and thus, the joint strength at the bonding region can be assured. Naturally, the quality of the bonding region also is superior. Furthermore, it is acceptable for the first bonding object W1 and the second bonding object W2 to be of different metal types respectively. Stated otherwise, the present invention also is applicable to cases where heterogeneous metal types are to be bonded together.

Further, in the present embodiment, the pressure inside the bonding vessel 12 is controlled so as to remain substantially constant. However, a control may also be performed in which the pressure is varied repeatedly between 3 to $10^5$ Pa, from a lower limit of 3 Pa to an upper limit of $10^5$ Pa.

Furthermore, in this embodiment, both of the bonding objects W1 and W2 are heated by carrying out electrical energizing with respect to the first bonding object W1 and the second bonding object W2. However, it is a matter of course that other heating methods, for example, high frequency induction heating or the like, could be adopted.

Still further, in place of the rotary pump 30, a diffusing pump or a turbomolecular pump or the like also could be provided.

Example 1

The bonding apparatus shown in FIGS. 1 and 2 was attached to a gas analysis system. More specifically, an outlet pipe was connected to the bonding vessel 12, and a gas analysis device and pressure measurement device, together with a computer, were connected with respect to the outlet pipe.

In this condition, the atmospheric gas and pressure inside the bonding vessel 12 were modified in various ways, whereby nitrogen gas and oxygen gas partial pressures were determined. The results are summarized in FIG. 3. From FIG. 3, it is clear that the oxygen partial pressure for a case in which the pressure in the nitrogen gas atmosphere was set at 3 Pa is equivalent to the oxygen gas partial pressure for a case in which the pressure was set at $3 \times 10^{-3}$ Pa.

From FIG. 3, it also is understood that the oxygen gas partial pressure for a case in which the pressure in the nitrogen gas atmosphere was set at $10^5$ Pa is remarkably smaller, compared to the oxygen gas partial pressure in an argon gas atmosphere at the same pressure. From this fact, it is understood that nitrogen gas can produce a smaller oxygen gas partial pressure than argon gas, and that oxidization of the bonding objects is easily avoided.

Example 2

The bottom surfaces of cylindrical columnar shaped bonding objects made from a SUS304 (stainless steel) material having a length of 30 mm and a bottom surface diameter of 12 mm were placed in contact with each other. In this state, while being pressed at 5.2 MPa by the first electrode 14 and the second electrode 16 of the bonding apparatus 10, electrical energizing was carried out at any of bonding temperatures of 700° C., 800° C., 900° C., 1000° C. and 1100° C., as measured by an R-type thermocouple attached by spot welding to the vicinity of the joint interface, whereby both bonding objects were bonded together. The bonding objects were heated to the bonding temperature at the rate of about 100° C./minute, and kept at the bonding temperature for 20 minutes. The bonding vessel 12 was filled with a nitrogen gas atmosphere at any of pressures of 5 Pa, $10^2$ Pa and $10^5$ Pa.

For purposes of comparison, the above-noted conditions were complied with except that the pressure was set at $10^{-2}$ Pa, 5 Pa, $10^2$ Pa and $10^5$ Pa while the interior of the bonding apparatus was supplied with atmospheric air, whereupon bonding together of the aforementioned bonding objects was carried out.

Figure 4:
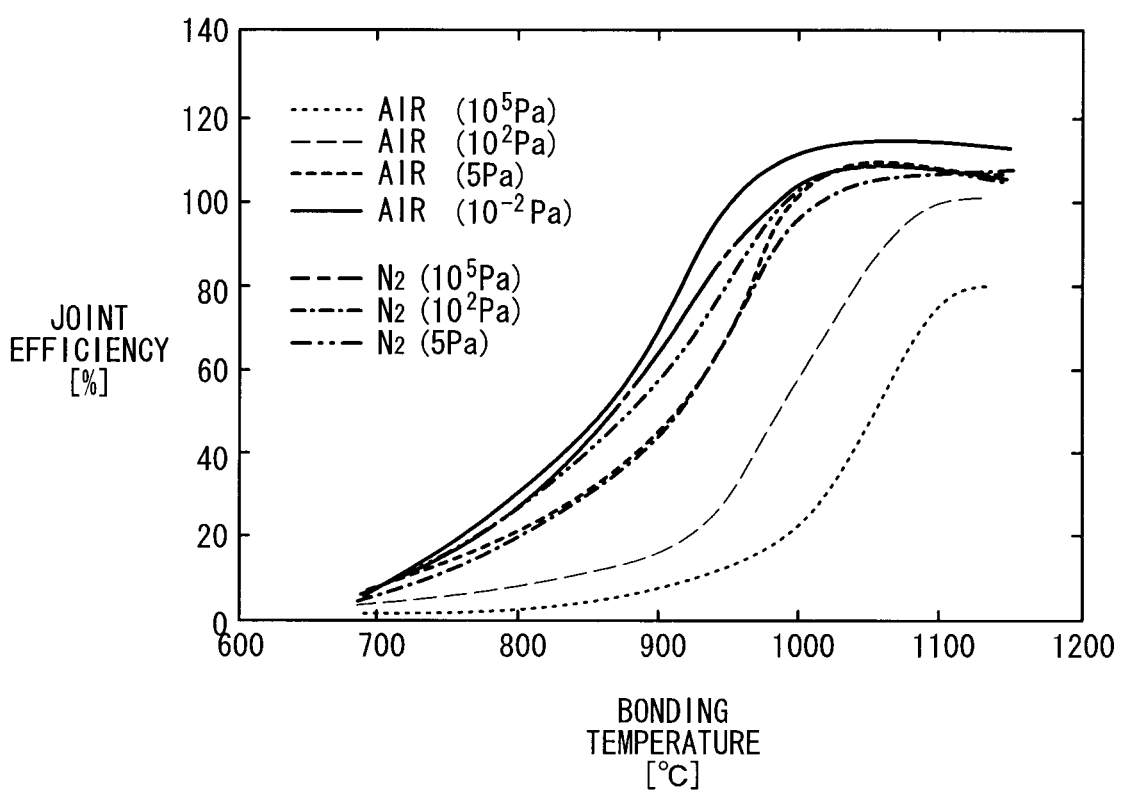
FIG. 4 is a graph showing the relationship between bonding temperature and joint efficiency in the bonded objects.

The relationship between joint efficiency, acquired by dividing the joint strength of each of the bonding objects by the strength of SUS304, and the bonding temperature is shown by the graph of FIG. 4. The tensile strength of the bonded objects, which were bonded together at 1000° C., is shown in FIG. 5. As made clear from FIG. 4, the joint efficiency is enhanced accompanying rising of the bonding temperature additionally with lowering of the atmospheric gas pressure, and at 1000° C. and 1100° C., a strength equivalent to that of SUS304 is obtained. Further, as understood from FIG. 5, assuming that the pressure inside the bonding vessel 12 was the same, in the case of a nitrogen gas environment, compared to an air atmosphere, the joint strength became greater.

Further, upon comparing the oxidized condition of the bonded objects after bonding was performed, when bonding was performed in a $10^5$ Pa atmosphere, a thick black colored oxidization film was formed. On the other hand, at $10^2$ Pa, a dark green colored oxidization film was confirmed, whereas at 5 Pa, an oxidization film did not exist and a metallic luster was confirmed.

In contrast thereto, even in the case of bonding in a nitrogen gas atmosphere, although a similar tendency was confirmed, at the same pressure the degree of oxidization was remarkably smaller compared to bonding in an air atmosphere. As for the reasons therefore, it is inferred to be due to the fact that the oxygen partial pressure was suppressed by providing a nitrogen gas environment.

Furthermore, using scanning electron microscopy (SEM), observation of the tensile breakage surface of each of the bonded objects, which had been bonded at 1000° C. under $10^5$ Pa and 5 Pa nitrogen gas atmosphere, and a $10^5$ Pa and $10^{-2}$ Pa air atmosphere, respectively, was performed. As a result, for either of the bonding objects that was bonded in an air atmosphere or the bonding objects bonded in a nitrogen gas atmosphere, dimples became larger accompanying lowering of the atmospheric gas pressure and a reduction in the amount of inclusions in each of the dimples was confirmed. Further, in the case of the same pressure, compared to bonding objects that were bonded in an air atmosphere, dimples were larger in bonding objects that were bonded in a nitrogen gas environment, and furthermore, the amount of inclusions was smaller. From these observations, it is clear that favorable bonding is obtained at smaller atmospheric gas pressures, whereas at the same pressure, more favorable bonding is obtained using nitrogen gas than with air.

Although certain preferred embodiments of the present invention have been shown and described in detail, it should be understood that various changes and modifications may be made therein without departing from the scope of the appended claims.

What is claimed is:

1. A diffusion bonding method in which, while heating is carried out with respect to a first bonding object and a second bonding object that are made of metal and in mutual contact, pressure is imparted to the first bonding object and the second bonding object, atoms of the first bonding object are diffused into the second bonding object, and atoms of the second bonding object are diffused into the first bonding object, whereby both bonding objects are joined together, the method comprising the steps of:

accommodating within a bonding vessel a first material that is capable of inducing nitrogen to enter into a solid solution and that is one of a steel material, nitrogen doped stainless steel, a nickel alloy, and a copper alloy, the first material being the first bonding object;

accommodating within the bonding vessel a second material that is capable of inducing nitrogen to enter into a solid solution and that is one of a steel material, nitrogen doped stainless steel, a nickel alloy, and a copper alloy, the second material being the second bonding object;

evacuating the bonding vessel such that a pressure inside of the bonding vessel is at least $10^{-1}$ Pa;

introducing a nitrogen gas into the evacuated bonding vessel, while controlling a pressure inside of the bonding vessel to be between 3-$10^5$ Pa; and heating the first bonding object and the second bonding object while applying pressure with respect to the first bonding object and the second bonding object.

2. The bonding method according to claim 1, wherein heating is carried out with respect to the first bonding object and the second bonding object by electrical energization thereof.

3. The bonding method according to claim 1, wherein heating is carried out with respect to the first bonding object and the second bonding object by high frequency heating.

4. A diffusion bonding apparatus in which, while heating is carried out with respect to a first bonding object and a second bonding object that are made of metal and in mutual contact, pressure is imparted to the first bonding object and the second bonding object, atoms of the first bonding object are diffused into the second bonding object, and atoms of the second bonding object are diffused into the first bonding object, whereby both bonding objects are joined together, comprising:

a heating mechanism that heats the first bonding object and the second bonding object;

a bonding vessel that accommodates therein a first material that is capable of inducing nitrogen to enter into a solid solution and that is one of a steel material, nitrogen doped stainless steel, a nickel alloy, and a copper alloy, the first material being the first bonding object and that accommodates therein a second material that is capable of inducing nitrogen to enter into a solid solution and that is one of a steel material, nitrogen doped stainless steel, a nickel alloy, and a copper alloy, the second material being the second bonding object;

a nitrogen gas supply source that supplies a nitrogen gas to the bonding vessel;

an exhaust mechanism that exhausts the bonding vessel such that a pressure inside the bonding vessel is at least $10^{-1}$ Pa; and a pressure control mechanism that controls a pressure of the nitrogen gas supplied from the nitrogen gas supply source and introduced into the bonding vessel, wherein the pressure control mechanism controls the pressure of the nitrogen gas introduced into the exhausted bonding vessel to be between 3-$10^5$ Pa.

5. The bonding apparatus according to claim 4, wherein the exhaust mechanism includes at least a rotary pump.

6. The bonding apparatus according to claim 4, wherein the heating mechanism comprises an energization mechanism including a power source and electrodes.

7. The bonding apparatus according to claim 4, wherein the heating mechanism comprises a high frequency heating mechanism.

* * * * *